J. L. MATTHEWS.
GEAR TESTING MACHINE.
APPLICATION FILED DEC. 27, 1920.
1,394,324.
Patented Oct. 18, 1921.
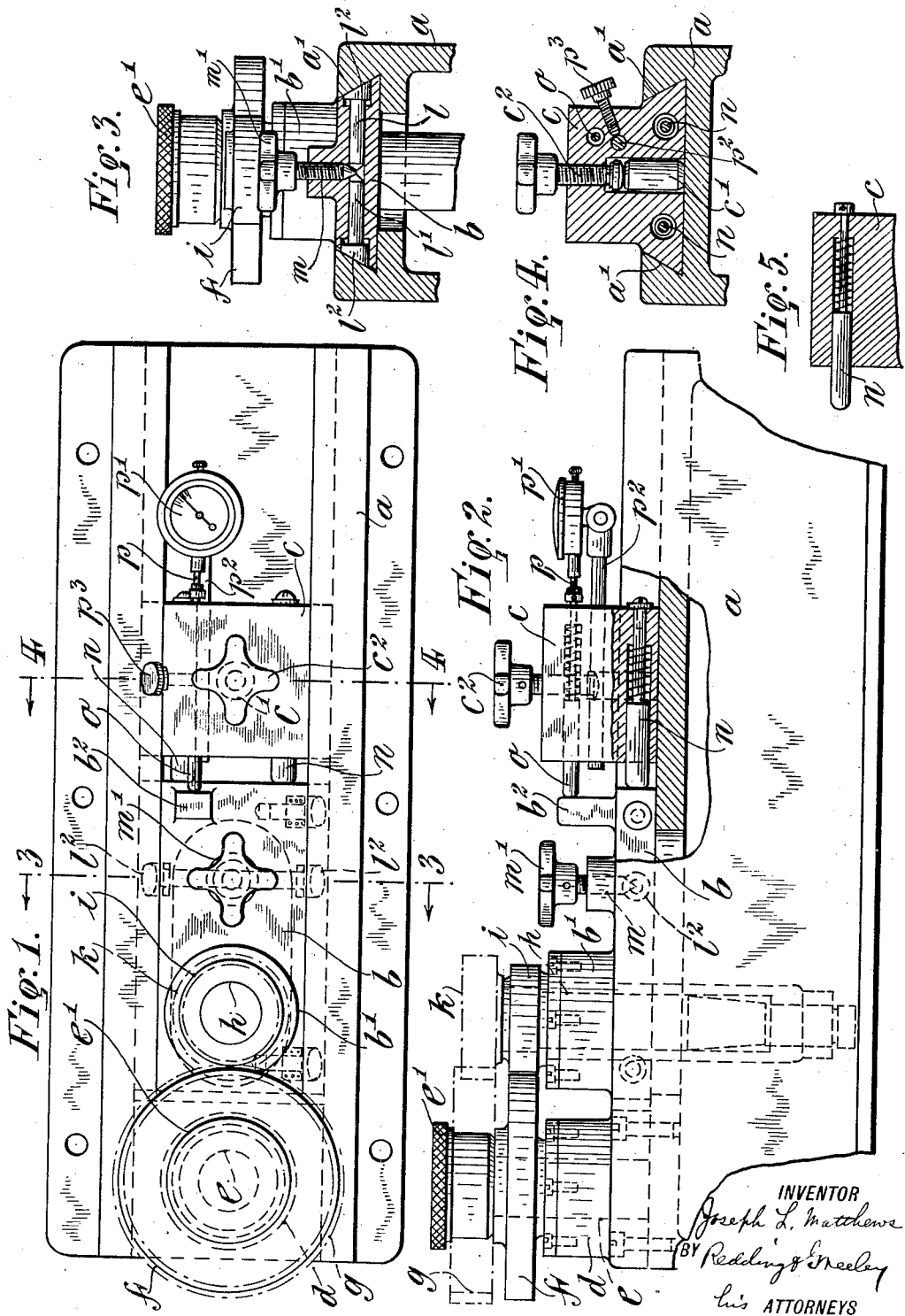

UNITED STATES PATENT OFFICE.

JOSEPH L. MATTHEWS, OF HIGHLAND PARK, NEW JERSEY, ASSIGNOR TO INTERNATIONAL MOTOR COMPANY, OF NEW YORK, N. Y., A CORPORATION OF DELAWARE.

GEAR-TESTING MACHINE.

1,394,324.  Specification of Letters Patent.  Patented Oct. 18, 1921.

Application filed December 27, 1920. Serial No. 433,128.

*To all whom it may concern:*

Be it known that I, JOSEPH L. MATTHEWS, a citizen of the United States, residing in Highland Park, in the State of New Jersey, have invented certain new and useful Improvements in Gear-Testing Machines, of which the following is a specification, reference being had to the accompanying drawing, forming a part hereof.

This invention relates to a type of gear testing machine in which blank disks of correct outline and properly centered are used in initially setting the indicator before the one or two gears to be tested are placed in position. More particularly, the invention is concerned with certain improvements in machines of this type whereby it is possible to increase the facility and speed of testing and secure a very sensitive and exact indication of the accuracy of the teeth, the accuracy of the pitch diameter of the gear under test, a correct indication of concentricity and, where a pair of gears is tested, a proper determination of the spacing of their centers. Another object is concerned with the provision of a machine which shall be of simple construction and convenient to assemble and manipulate. These and other objects of the invention will appear in greater detail hereinafter in connection with the description of the embodiment illustrated in the drawing, wherein—

Figure 1 is a view in plan of the improved machine.

Fig. 2 is a fragmentary view in side elevation thereof, parts being broken away to show the relation between the indicator head, the slide and the spring pressed plungers carried with the head.

Fig. 3 is a view in transverse section taken on the plane indicated by the line 3—3 of Fig. 1 and looking in the direction of the arrows.

Fig. 4 is a view in transverse section taken on the plane indicated by the line 4—4 of Fig. 1 and looking in the direction of the arrows.

Fig. 5 is a fragmentary sectional detail view showing the spring pressed plunger in the head between the indicator and the slide.

The base of the machine $a$ is formed with undercut ways $a'$ in which are slidably mounted a slide $b$ and an indicator head $c$. At one end of the base $a$ is supported fixedly a bearing $d$ in which is journaled a vertical spindle $e$ having mounted thereon a circular hardened master disk $f$ of any pitch diameter. On the same shaft $e$ and above the disk $f$ may be mounted a spur gear $g$, which is used for rolling with a gear to be tested or, where two gears intended for permanent meshing are to be tested, this spur gear $g$ is illustrative of one of them. On the shaft $e$ may be secured removably a knurled retaining disk $e'$ which may secure the gear $g$ in place and be used as a convenient hand hold for rotating the gear $g$ with the disk $f$ when desired.

On the slide $b$ is carried a bearing $b'$ in which is journaled a vertical shaft $h$ on which is mounted a hardened circular master disk $i$ of the same diameter as the pitch diameter of the gear to be tested. The shaft $a$ extends upwardly to receive removably a spur gear $k$ to be tested. Extending transversely of the slide $b$ and preferably alined with one another are slidable pins $l$, $l'$ formed at their outer ends with clamping pieces $l^2$ which are adapted to be forced into clamping relation with the undercut ways $a'$ and lock the slide $b$ against movement. The inner ends of the pins $l$, $l'$ are beveled and engaged by the tapered end of a clamping screw $m$ on which is carried a convenient hand wheel $m'$ to permit rotation of the screw $m$ for the purpose of clamping and releasing the pieces $l^2$.

The indicator head $c$ has mounted longitudinally thereof a plurality of spring pressed plungers $n$, the ends of which protrude beyond the face of the head for engagement with the proximate end of the slide $b$. In the head $c$ is also mounted a spring pressed plunger $o$ which extends through the head and has one end for engagement with an ear $b^2$ on the slide $b$, and the other end for engagement with an actuating plunger $p$ of an indicator $p'$. The indicator $p$ is supported on a rod $p^2$ which extends into the head $c$ and is clamped therein by means of a set screw $p^3$. Associated with the head $c$ is a suitable clamp shown as a loose plunger $c'$ which bears against the bottom wall of the channel formed by the walls $a'$ in the base $a$ and is actuated by a hand screw, indicated at $c^2$. By manipulation of the hand screw $c^2$ the clamp $c'$ can be forced against the base $a$ so as to hold the head $c$ against movement thereon.

The machine has such elements that gears of any ratio but of the same pitch can be tested with the same master gear and disk. The master circular disks $i$, $f$ are formed to run on predetermined centers and to roll accurately. As pointed out before the spur gear $g$ will usually be a master gear of any predetermined pitch and adapted for use in testing a pinion ($k$) intended to coöperate with such a gear. The test is to be made for unevenness in teeth, lack of concentricity and determination of centers. The head $c$ and slide $b$ are unclamped. The slide $b$ is moved until the disk $i$ is at a predetermined distance from the disk $f$, this distance being determined by a feeler gage. Clearance between the disks will depend on the permissible error in pitch diameters. The slide $b$ will be clamped with the disks $i$, $f$, so spaced. The head $c$ will now be moved to bring the plunger $o$ into engagement with the ear $b^2$ thereby causing relative movement between the plunger and the head and consequent movement of the plunger $p$ of the indicator $p'$. For convenience, it will usually be desirable to slide the head $c$ until the index needle registers a distance equal to the predetermined spacing of the disks $f$, $i$. The head $c$ will be clamped in position with the needle at such a setting. The slide $b$ will then be unclamped by manipulation of the hand wheel $m'$. The spring pressed plunger $m$ will immediately force the slide $b$ to the left until the disks $f$, $i$ bear against one another. The pinion $k$ to be tested is then placed on the shaft $h$ in mesh with the master gear $g$. For gears having accurate pitch diameters equal to the diameters of the disks $f$, $i$, the indicator hand will remain stationary. When the gears are rotated, however, all irregularities in the teeth, lack of concentricity, and variation in centers will be sensitively and exactly indicated by oscillations of the pointer on the index $p'$. The tester can readily observe whether these variations exceed the predetermined permissible error. Where the initial setting has been made in the manner described the permissible error in one direction would cause the hand to indicate zero, while the permissible error in the other direction would cause the hand to register twice the distance of its initial setting. Having the initial setting it is evident that the head $c$ need not be unclamped during a test run and that succeeding pinions $k$ can be readily placed on the shaft $h$ and removed therefrom after revolving the gears $g$, $k$.

I claim as my invention:

1. In a gear testing machine, a base provided with ways, a slide and an indicator head mounted reciprocably in said ways, means to clamp the slide and head in the ways, a relatively fixed vertical spindle mounted on the base, a vertical spindle mounted on the slide, circular master disks mounted on the respective spindles, said spindles being adapted to receive gears, an indicator mounted on the indicator head, means to operatively engage the indicator head with the slide, and means to press the slide along the ways toward the said relatively fixed vertical spindle.

2. In a gear testing machine, a base provided with ways, a slide and an indicator head reciprocable in said ways, a vertical spindle journaled in said base, a vertical spindle journaled in said slide, coöperating circular master disks carried on said spindles, said spindles being adapted to receive intermeshing gears, an indicator carried with the head, a spring pressed connection between the indicator head and the slide, spring pressed plungers carried with the head and engaging the proximate edge of the slide, and means to clamp the head and the slide in the ways.

3. In a gear testing machine, in combination with a base provided with ways, a vertical spindle carried with the base to support a gear, a slide mounted reciprocably in said ways and having a vertical spindle to carry a gear for meshing with said first named gear, oppositely extending clamping pieces mounted transversely of said slide and having their outer ends in engagement with said ways and having their inner ends beveled, and a hand screw to engage said beveled ends to force the members in clamping engagement with the ways.

This specification signed this 20th day of December, A. D. 1920.

JOSEPH L. MATTHEWS.